(12) United States Patent
Sawada et al.

(10) Patent No.: US 9,718,408 B2
(45) Date of Patent: Aug. 1, 2017

(54) VEHICLE VISUAL RECOGNITION DEVICE

(71) Applicant: KABUSHIKI KAISHA TOKAI-RIKA-DENKI-SEISAKUSHO, Aichi-ken (JP)

(72) Inventors: Kazuhiro Sawada, Aichi-ken (JP); Mutsumi Shiohara, Aichi-ken (JP); Noriyoshi Kimata, Aichi-ken (JP); Tomotaka Nishio, Gifu-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 71 days.

(21) Appl. No.: 14/844,565

(22) Filed: Sep. 3, 2015

(65) Prior Publication Data

US 2016/0068107 A1 Mar. 10, 2016

(30) Foreign Application Priority Data

Sep. 9, 2014 (JP) ................................. 2014-183444

(51) Int. Cl.

| | |
|---|---|
| *B60Q 1/26* | (2006.01) |
| *B60R 1/074* | (2006.01) |
| *B60Q 1/00* | (2006.01) |
| *B60Q 1/34* | (2006.01) |
| *B60R 1/072* | (2006.01) |
| *B60R 1/12* | (2006.01) |
| *F21S 8/10* | (2006.01) |

(52) U.S. Cl.
CPC ............ *B60R 1/074* (2013.01); *B60Q 1/0088* (2013.01); *B60Q 1/2665* (2013.01); *B60Q 1/2692* (2013.01); *B60Q 1/34* (2013.01); *B60R 1/072* (2013.01); *B60R 1/1207* (2013.01); *F21S 48/30* (2013.01)

(58) Field of Classification Search
CPC .. B60Q 1/0088; B60Q 1/2665; B60Q 1/2669; B60R 1/1207; F21S 48/30
See application file for complete search history.

(56) References Cited

U.S. PATENT DOCUMENTS

2005/0105299 A1* 5/2005 Gilbert ................. B60Q 1/2665
362/494

FOREIGN PATENT DOCUMENTS

| JP | 2007-030816 A | 8/2007 |
|---|---|---|
| JP | 2013-067195 A | 4/2013 |
| JP | 2013-067245 A | 4/2013 |

OTHER PUBLICATIONS

Japanese Office Action of JP2014-183444 dated Aug. 11, 2015 and English translation of Japanese Office Action.

* cited by examiner

*Primary Examiner* — Ali Alavi
(74) *Attorney, Agent, or Firm* — Roberts Mlotkowski Safran Cole & Calderon P.C.

(57) ABSTRACT

In a vehicle door mirror device, a first cord and a second cord are arranged passing through a storing mechanism in an up-down direction. A first connector of the first cord is electrically connected to a mirror face adjustment device through an assembly hole of a visor body. Moreover, a second connector of the second cord is electrically connected to a turn signal lamp. The first cord and the second cord are disposed at a vehicle rear side of the storing mechanism, and pass between the storing mechanism and the visor body. This thereby enables the first cord and the second cord to be made shorter.

10 Claims, 7 Drawing Sheets

VEHICLE VISUAL RECOGNITION DEVICE

CROSS-REFERENCE TO RELATED APPLICATION

This application claims priority under 35 USC 119 from Japanese Patent Application No. 2014-183444 filed Sep. 9, 2014, the disclosure of which is incorporated by reference herein.

BACKGROUND

Field of the Invention

The present invention relates to a vehicle visual recognition device in which a visual recognition section assists vision of a vehicle occupant.

Related Art

In an electric door mirror described in Japanese Patent Application Laid-Open (JP-A) No. 2013-67195, a mirror face angle adjustment unit and a turn lamp (turn signal lamp) unit are supported on an electric storing (housing) unit. A pair of harnesses are laid out penetrating through the electric storing unit, and are respectively electrically connected to the mirror face angle adjustment unit and the turn signal lamp unit.

In such an electric door mirror, generally, the harness connected to the mirror face angle adjustment unit is arranged (laid out) at an upper side of the electric storing unit, and the harness connected to the turn signal lamp unit is arranged at an upper side of the electric storing unit and the mirror face angle adjustment unit.

SUMMARY

In consideration of the above circumstances, a vehicle visual recognition device enabling a shorter cord is obtained.

A vehicle visual recognition device of a first aspect includes: a storing mechanism that is supported at a vehicle body side; a visual recognition section that is supported at the storing mechanism, that assists visual recognition of a vehicle occupant, and that is stored or deployed by being rotated by the storing mechanism; an addition mechanism that is supported at the storing mechanism, and that adds a function; and a cord that is arranged in the storing mechanism, that is arranged on a visual recognition section side of the storing mechanism, and that is electrically connected to the addition mechanism.

A vehicle visual recognition device of a second aspect includes: a storing mechanism that is supported at a vehicle body side; an adjustment mechanism that is supported at the storing mechanism; a visual recognition section that is supported at the adjustment mechanism, that assists visual recognition of a vehicle occupant, that is tilted and adjusted in orientation by the adjustment mechanism, and that is stored or deployed by being rotated by the storing mechanism; an addition mechanism that is supported at the storing mechanism, that is disposed on the opposite side of the adjustment mechanism from the storing mechanism, and that adds a function; and a cord that is arranged in the storing mechanism, that is arranged on the opposite side of the adjustment mechanism from the visual recognition section, and that is electrically connected to the addition mechanism.

A vehicle visual recognition device of a third aspect is the vehicle visual recognition device of the second aspect, further including: a hooking portion that is disposed at the adjustment mechanism, and onto which the cord is hooked; and a restriction member that is disposed on the opposite side of the hooking portion from the cord, and that restricts movement of the hooking portion.

In the vehicle visual recognition device of the first aspect, it is possible that the storing mechanism includes a rotating body that rotates with respect to the vehicle body; the addition mechanism includes: an adjustment mechanism that is supported at the storing mechanism and that adjusts orientation of the visual recognition section, and an addition section that is supported at the storing mechanism, and that is disposed on the opposite side of the adjustment mechanism from the rotating body; the cord includes a first cord that electrically connects the vehicle body side with the adjustment mechanism, and a second cord that electrically connects the vehicle body side with the addition section; and the first cord and the second cord are arranged on a visual recognition section side of the rotating body.

Further in the above vehicle visual recognition device, it is possible that the second cord is arranged on the opposite side of the adjustment mechanism from the visual recognition section.

Further in the above vehicle visual recognition device, it is possible that it further includes: a hooking portion that is disposed at the adjustment mechanism, and onto which the first cord and the second cord are hooked; and a restriction member that is disposed on the opposite side of the hooking portion from the first cord and the second cord, and that restricts movement of the hooking portion.

Further in the above vehicle visual recognition device, it is possible that the addition section is a lamp.

In the vehicle visual recognition device of the first aspect, it is possible that the storing mechanism includes a rotating body that rotates with respect to the vehicle body; the addition mechanism is an adjustment mechanism that is supported at the storing mechanism and that adjusts orientation of the visual recognition section; and the cord is arranged on a visual recognition section side of the rotating body.

Further in the above vehicle visual recognition device, it is possible that it further includes: a hooking portion that is disposed at the adjustment mechanism, and onto which the cord is hooked; and a restriction member that is disposed on the opposite side of the hooking portion from the cord, and that restricts movement of the hooking portion.

In the vehicle visual recognition device of the first aspect, the storing mechanism is supported at the vehicle body side, and the visual recognition section is supported at the storing mechanism. The visual recognition section assists visual recognition (vision) of the vehicle occupant. Moreover, the visual recognition section is stored or deployed by being rotated by the storing mechanism. The addition mechanism is supported at the storing mechanism, and the addition mechanism provides a function.

The cord is arranged in the storing mechanism, and the cord is electrically connected to the addition mechanism.

Note that the cord is arranged on the visual recognition section side of the storing mechanism. This thereby enables the cord to be made shorter.

In the vehicle visual recognition device of the second aspect, the storing mechanism is supported at the vehicle body side, and the adjustment mechanism is supported at the storing mechanism. The visual recognition section is supported on the storing mechanism, and the visual recognition section assists visual recognition (vision) of the vehicle occupant. Moreover, the visual recognition section is tilted to be adjusted in orientation by the adjustment mechanism, and is stored or deployed by being rotated by the storing mechanism. The addition mechanism is supported on the storing mechanism and is disposed on the opposite side of the adjustment mechanism from the storing mechanism, and the addition mechanism provides a function.

The cord is arranged in the storing mechanism, and the cord is electrically connected to the addition mechanism.

Note that the cord is arranged on the opposite side of the adjustment mechanism from the visual recognition section. This thereby enables the cord to be made shorter.

In the vehicle visual recognition device of the third aspect, the hooking portion is disposed on the adjustment mechanism, and the cord is hooked onto the hooking portion. The restriction member is disposed on the opposite side of the hooking portion from the cord, and the restriction member restricts movement of the hooking portion. This thereby enables the cord to be restricted from coming away from the hooking portion.

BRIEF DESCRIPTION OF THE DRAWINGS

Embodiment will be described in detail with reference to the following figures, wherein.

DETAILED DESCRIPTION

Figure 1:
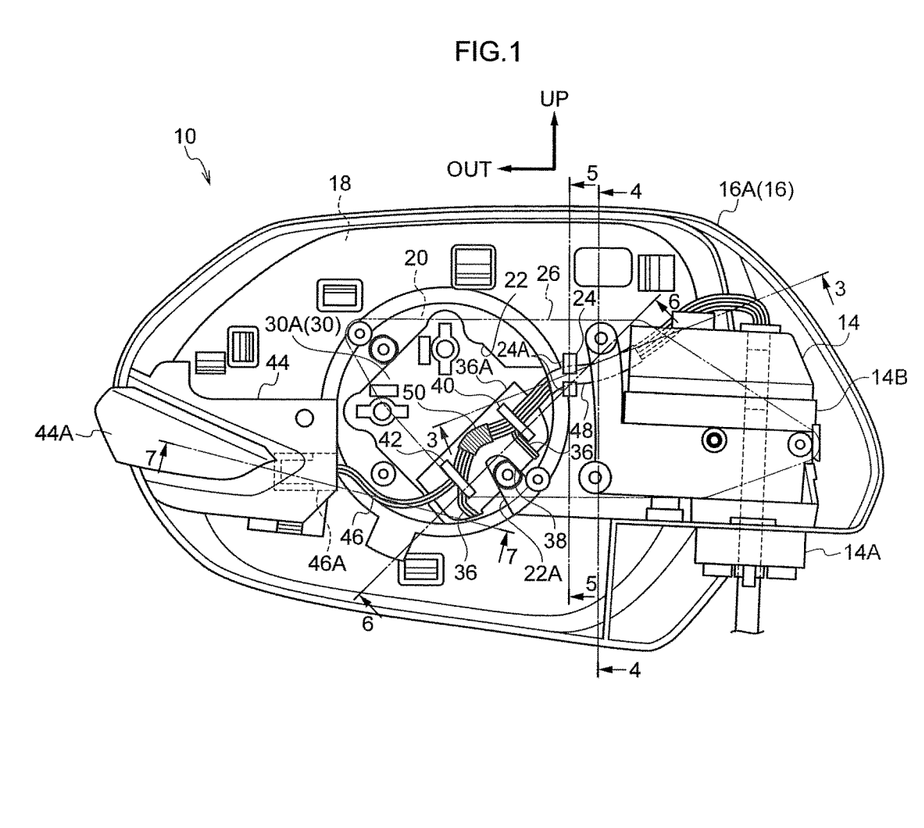
FIG. 1 is a back face view illustrating relevant portions of a vehicle door mirror device according to an exemplary embodiment of the present invention, as viewed from the front side of the vehicle.
Figure 2:
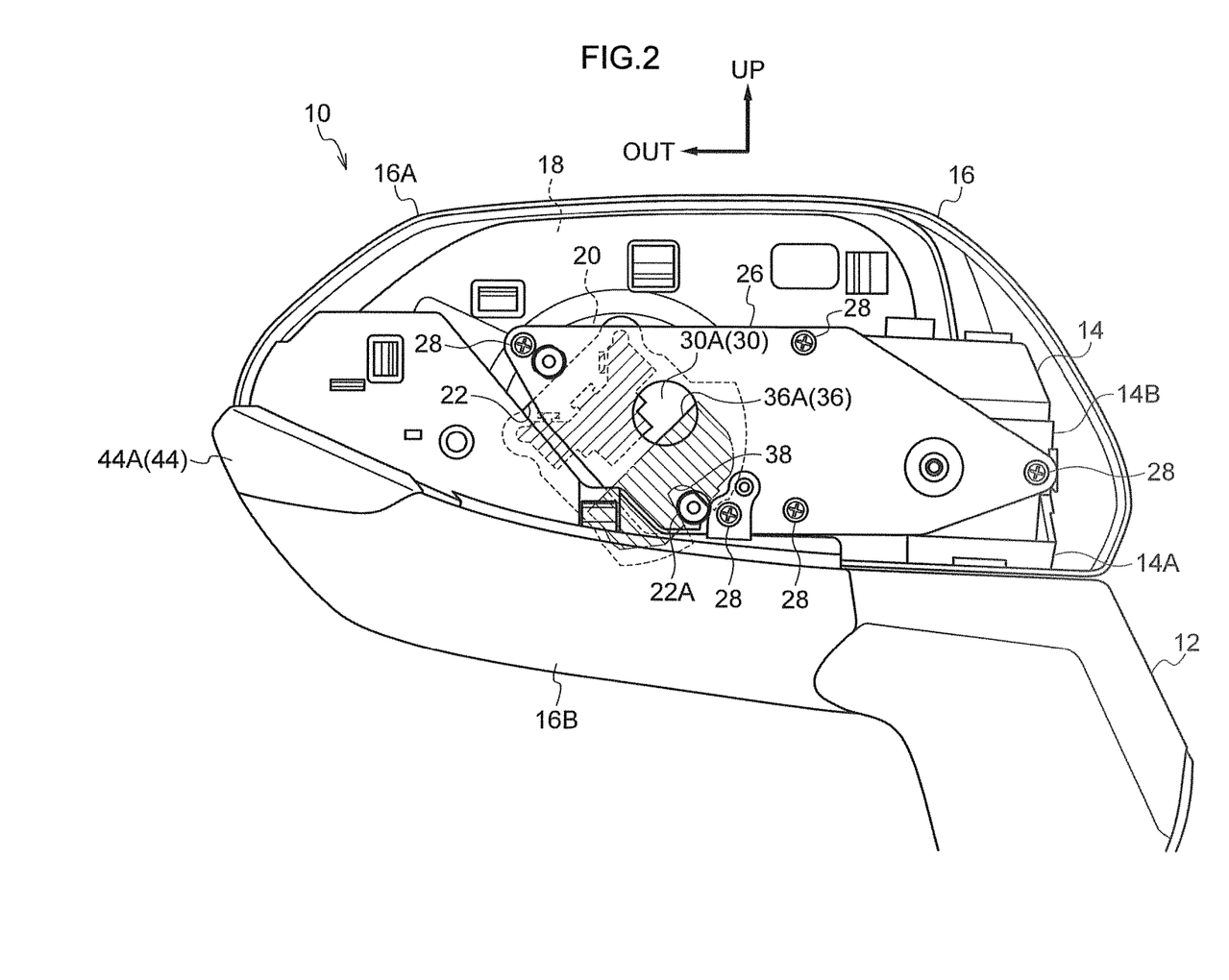
FIG. 2 is a back face view illustrating a vehicle door mirror device according to an exemplary embodiment of the present invention, as viewed from the front side of the vehicle.

FIG. 1 is a back face view illustrating relevant portions of a vehicle door mirror device 10 (vehicle mirror device) according to an exemplary embodiment applied with a vehicle visual recognition device, as viewed from the front side of the vehicle. FIG. 2 is a back face view of the vehicle door mirror device 10, as viewed from the front side of the vehicle. In the drawings, the arrow FR indicates the vehicle front, the arrow OUT indicates the vehicle width direction outside (vehicle right side), and the arrow UP indicates upward.

The vehicle door mirror device 10 according to the present exemplary embodiment is installed to the outer side of a vehicle door (front side door, vehicle body side).

As illustrated in FIG. 2, the vehicle door mirror device 10 is provided with a stay 12 serving as an installation body. The stay 12 is fixed to a vehicle front side end of an up-down direction intermediate portion of the door, thereby installing the vehicle door mirror device 10 to the door.

As illustrated in FIG. 1 and FIG. 2, a storing (housing) mechanism 14 (retractor) is supported at an upper side of the stay 12. A stand 14A, serving as a support body, is provided at the storing mechanism 14, and the stand 14A is fixed to the stay 12. A rotating (swinging) body 14B is supported on the stand 14A, and the rotating body 14B rotates (swings) about the up-down direction with respect to the stand 14A when the storing mechanism 14 is electrically or manually operated.

Figure 3:
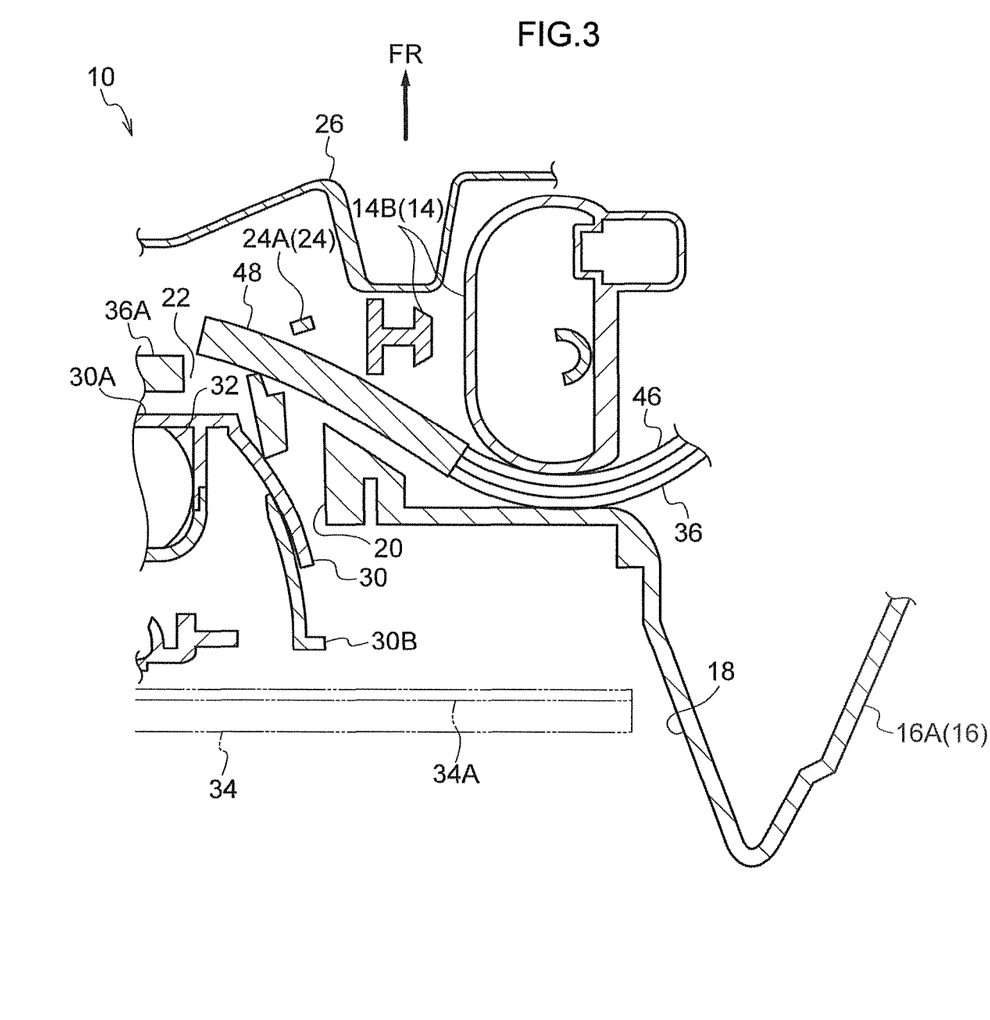
FIG. 3 is a cross-section (a cross-section along line 3-3 in FIG. 1), illustrating a vehicle door mirror device according to an exemplary embodiment of the present invention, as viewed from the lower side.
Figure 4:
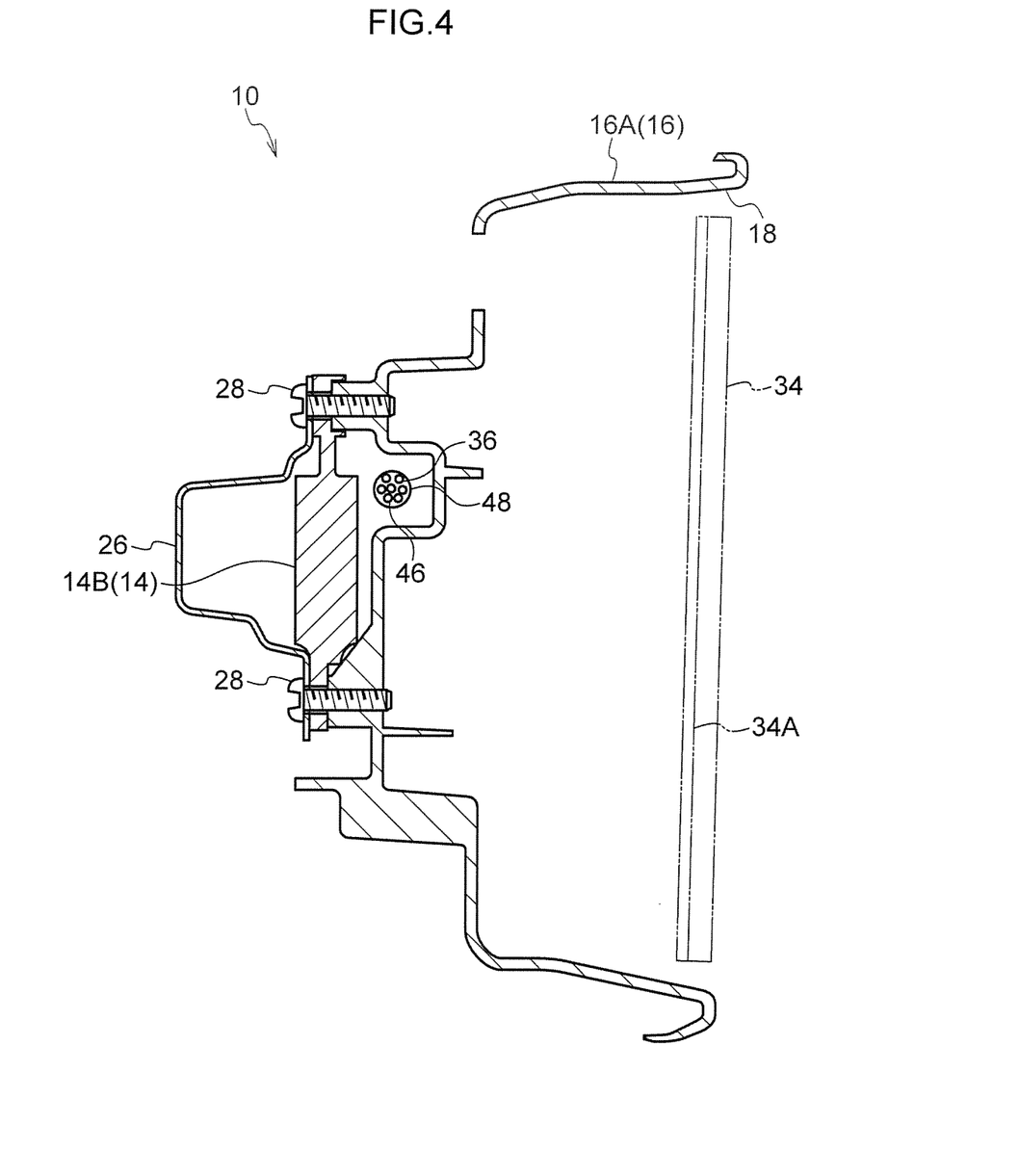
FIG. 4 is a cross-section (a cross-section along line 4-4 in FIG. 1), illustrating a vehicle door mirror device according to an exemplary embodiment of the present invention, as viewed from the vehicle width direction inside.
Figure 5:
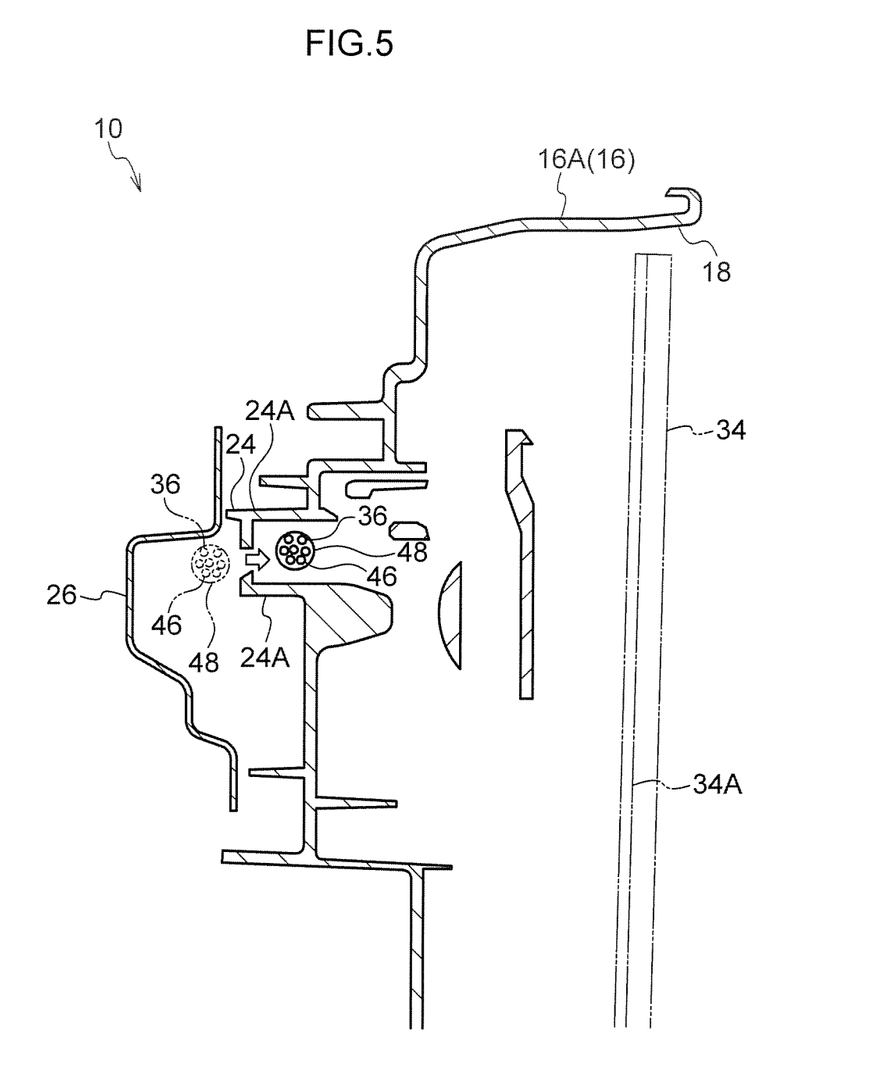
FIG. 5 is a cross-section (a cross-section along line 5-5 in FIG. 1), illustrating a vehicle door mirror device according to an exemplary embodiment of the present invention, as viewed from the vehicle width direction inside.

A resin visor 16, serving as a cover body, is supported on the rotating body 14B of the storing mechanism 14. The visor 16 is provided with a visor body 16A, serving as an assembly member, and a vehicle width direction inside end portion of the visor body 16A is fixed to a vehicle rear side of the rotating body 14B. The visor body 16A is formed with a substantially rectangular parallelopiped shaped accommodating chamber 18 (see FIG. 3 to FIG. 7), and the accommodating chamber 18 is open toward the vehicle rear side. A bottom wall (vehicle front side wall) of the accommodating chamber 18 is formed with a substantially circular column shaped assembly chamber 20 (see FIG. 3, FIG. 6, and FIG. 7). The assembly chamber 20 is open toward the vehicle rear side, and includes a peripheral wall and a bottom wall (vehicle front side wall) projecting out toward the vehicle front side of the bottom wall of the accommodating chamber 18. A substantially rectangular shaped assembly hole 22 is formed penetrating the bottom wall of the assembly chamber 20, and a peripheral edge on the vehicle width direction inside and lower side of the assembly hole 22 is curved in a protruding (convex) shape. A substantially rectangular plate shaped projecting wall 22A is provided at the bottom wall of the assembly chamber 20. The projecting wall 22A projects out from the vehicle width direction inside and lower side end portion of the assembly hole 22 toward the inside of the assembly hole 22.

A hook 24 (see FIG. 5), serving as a hooking portion, is integrally provided to a vehicle front side face of the visor body 16A, between the assembly hole 22 and the rotating body 14B of the storing mechanism 14. The hook 24 is disposed at a lower side of an upper end of the storing mechanism 14. The hook 24 is provided with a pair of hook portions 24A that have L-shaped rod shapes, and the pair of hook portions 24A are disposed facing each other in the up-down direction. Base end side portions of the hook portions 24A extend out from the visor body 16A toward the vehicle front side. A leading end side portion of the hook portion 24A which is on the upper side projects out toward the lower side, and a leading end side portion of the hook portion 24A which is on the lower side projects out toward the upper side.

A curved plate shaped lower visor cover 16B configuring a cover member is assembled to a lower side portion of the vehicle front side of the visor body 16A. The lower visor cover 16B covers the lower side portion of the vehicle front side of the visor body 16A. A curved plate shaped upper visor cover (not shown in the drawings) configuring a cover member is assembled to an upper side portion of the vehicle front side of the visor body 16A. The upper visor cover covers the upper side portion of the vehicle front side of the visor body 16A.

Metal reinforcement 26 that has an elongated plate shape, and serves as a restriction member and a reinforcement member, is assembled (fixed) to a vehicle front side of the rotating body 14B of the storing mechanism 14 and the visor body 16A of the visor 16 using screws 28. The reinforcement 26 has higher rigidity than the visor body 16A. The reinforcement 26 reinforces the visor body 16A and the rotating body 14B, and the reinforcement 26 couples the visor body 16A and the rotating body 14B, thus raising joint strength between the visor body 16A and the rotating body 14B. The reinforcement 26 covers the assembly hole 22 of the visor body 16A, and the reinforcement 26 reinforces the assembly hole 22 portion of the visor body 16A. As illustrated in detail in FIG. 4, the rotating body 14B is assembled (fixed) to the visor body 16A using the screws 28 at an upper end and a lower end of a vehicle width direction outside end portion of the rotating body 14B.

A mirror face adjustment device 30 (remote controlled unit, see FIG. 3, FIG. 6, and FIG. 7), serving as a addition mechanism and an adjustment mechanism, is inserted into the accommodating chamber 18 and the assembly chamber 20 of the visor body 16A from the vehicle rear side.

The mirror face adjustment device 30 is provided with a substantially semispherical container shaped resin case 30A, serving as a support member, and the case 30A is fixed inside the assembly chamber 20 of the visor body 16A, thereby assembling the mirror face adjustment device 30 to the visor body 16A. A vehicle rear side face of the case 30A is open, and a center axial line of the case 30A (a line that is perpendicular to the vehicle rear side face of the case 30A and that passes through the center of the vehicle rear side face of the case 30A) is disposed parallel to the vehicle front-rear direction. A vehicle front side wall of the case 30A is configured in a substantially circular plate shape, and the vehicle front side wall of the case 30A is disposed coaxially to the center axial line of the case 30A. A pair of motors 32, serving as drive units, are fixed inside the case 30A.

A substantially circular plate shaped resin mirror holder 30B, serving as a tilting member, is provided at the vehicle rear side of the case 30A. The mirror holder 30B is supported by the case 30A so as to be capable of tilting. The mirror holder 30B is mechanically connected to each of the pair of motors 32, and at least one of the pair of motors 32 is driven to tilt the mirror holder 30B in at least one of the up-down direction or the vehicle width direction.

The mirror holder 30B retains (supports) a substantially rectangular plate shaped mirror 34 (see FIG. 3 to FIG. 7), serving as a visual recognition section, at a vehicle rear side. The mirror 34 is capable of tilting integrally with the mirror holder 30B. The mirror 34 is housed in the accommodating chamber 18 of the visor body 16A of the visor 16, and the entire periphery and vehicle front side of the mirror 34 are covered by the visor body 16A. A mirror face (mirror finished surface) 34A of the mirror 34 (the front surface of a reflective layer on the back side) is directed toward the vehicle rear side, and the mirror 34 is capable of assisting viewing (visual recognition) of the vehicle rear side by an occupant (in particular the driver) of the vehicle.

A first cord 36 (harness), serving as a cord, is electrically connected to the pair of motors 32 inside the case 30A. Routing (arrangement) of the first cord 36 is explained as follows. The first cord 36 is arranged (laid out) from the vehicle front side of the visor body 16A, through the assembly hole 22 of the visor body 16A, and at the vehicle front side wall of the case 30A. A leading end of the first cord 36 is provided with a substantially rectangular plate shaped first connector 36A, serving as a connection portion, and the first connector 36A is provided with a terminal (not shown in the drawings). The terminal is electrically connected to the first cord 36, and extends out from the first connector 36A toward the vehicle rear side. The first connector 36A is assembled to the vehicle front side wall of the case 30A, and the terminal penetrates through the vehicle front side wall of the case 30A, thereby so as to electrically connect the first connector 36A (terminal) to the pair of motors 32, and so as to electrically connect the first cord 36 to the pair of motors 32. The first cord 36 is arranged (laid out) penetrating (passing) through the storing mechanism 14 (the stand 14A and the rotating body 14B) in the up-down direction, and is arranged (laid out) penetrating through the stay 12. The pair of motors 32 are electrically connected to the vehicle body side, namely, a vehicle controller (not shown in the drawings) by the first cord 36.

The first cord 36 is inserted inside the hook 24 by resiliently deforming the upper side and lower side hook portions 24A of the hook 24 of the visor body 16A toward the upper side and lower side respectively, and hooking the first cord 36 onto the hook 24. The first cord 36 is restricted from unhooking (releasing hooking) from the hook 24 by the leading end side portions of the pair of hook portions 24A (see FIG. 5). The first cord 36 is disposed on the vehicle rear side of the rotating body 14B of the storing mechanism 14, and passes between the rotating body 14B and the visor body 16A (see FIG. 3). The first cord 36 is disposed between the assembly locations of the rotating body 14B to the visor body 16A using the screws 28 (see FIG. 4), thereby restricting the first cord 36 from coming away from the vehicle rear side of the rotating body 14B.

A peripheral face on the vehicle width direction inside and lower side of the first connector 36A is substantially curved in a protruding (convex) shape, and the peripheral face on the vehicle width direction inside and lower side of the first connector 36A is disposed substantially following (along) the peripheral edge at the vehicle width direction inside and lower side of the assembly hole 22 of the visor body 16A. A substantially rectangular shaped fitting hole 38 is formed penetrating an end portion on the vehicle width direction inside and lower side of the first connector 36A, and the projecting wall 22A of the visor body 16A is fitted into the fitting hole 38. A vehicle front side face of the first connector 36A is disposed in the same plane as a vehicle front side face of the bottom wall of the assembly chamber 20 of the visor body 16A, such that the terminal of the first connector 36A is sufficiently inserted into the case 30A so as to be suitably connected to the pair of motors 32.

A first hook portion 40 (additional hooking portion) and a second hook portion 42 (hooking portion), each having a plate shape with a substantially L-shaped cross-section, are integrally provided to a vehicle width direction inside and upper side portion, and a vehicle width direction outside and lower side portion of the vehicle front side face of the first connector 36A. The first hook portion 40 is disposed at a lower side of the hook 24 of the visor body 16A. Base end side portions of the first hook portion 40 and the second hook portion 42 extend out from the first connector 36A toward the vehicle front side, and leading end side portions of the first hook portion 40 and the second hook portion 42 extend out toward the upper side and the vehicle width direction outside. Leading ends of the first hook portion 40 and the second hook portion 42 are integrally provided with projections (not shown in the drawings), and the projections project out from the leading ends of the first hook portion 40 and the second hook portion 42 toward the first connector 36A side (vehicle rear side).

Figure 6:
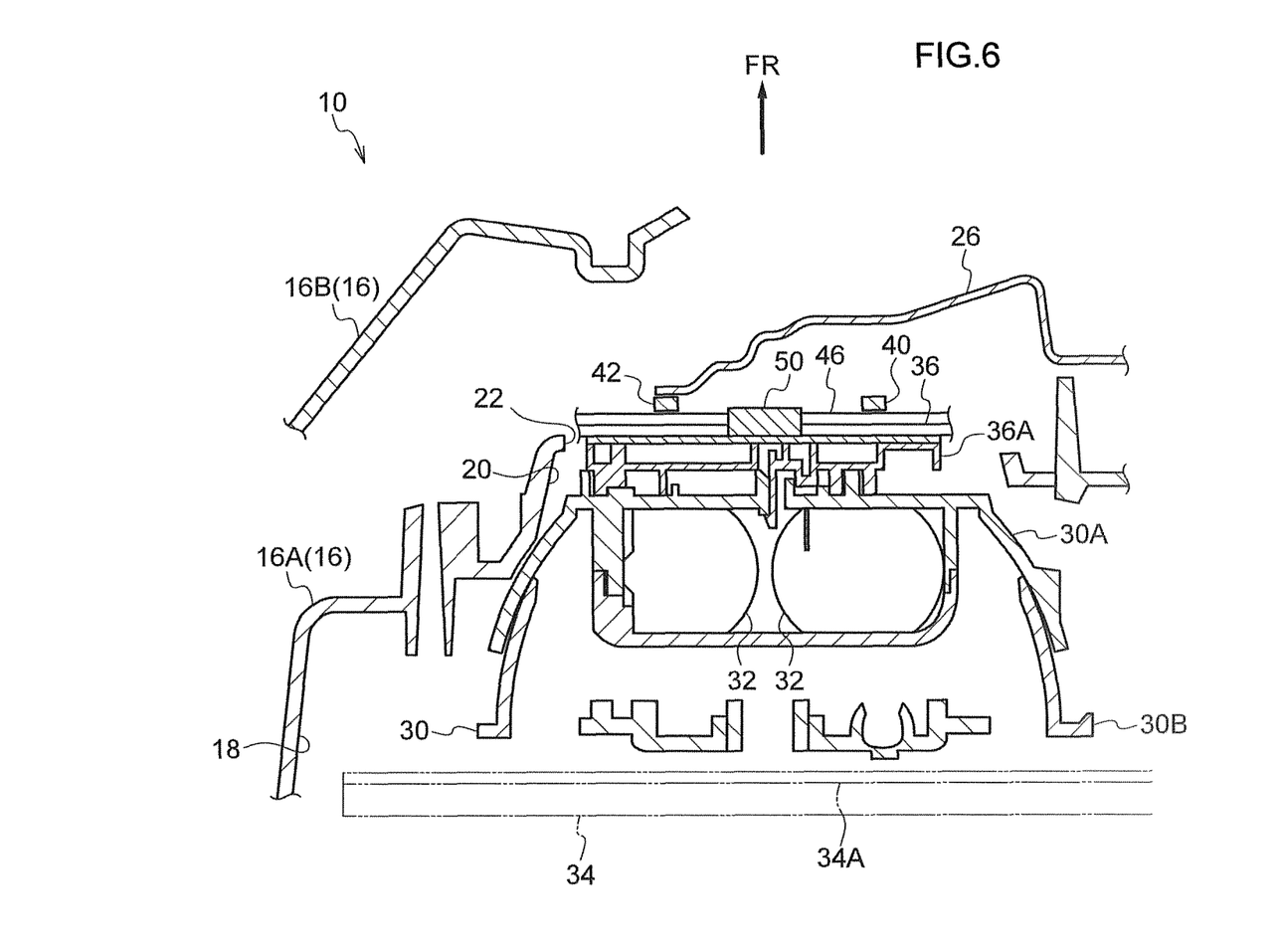
FIG. 6 is a cross-section (a cross-section along line 6-6 in FIG. 1), illustrating a vehicle door mirror device according to an exemplary embodiment of the present invention, as viewed from the vehicle width direction inside and lower side.
Figure 7:
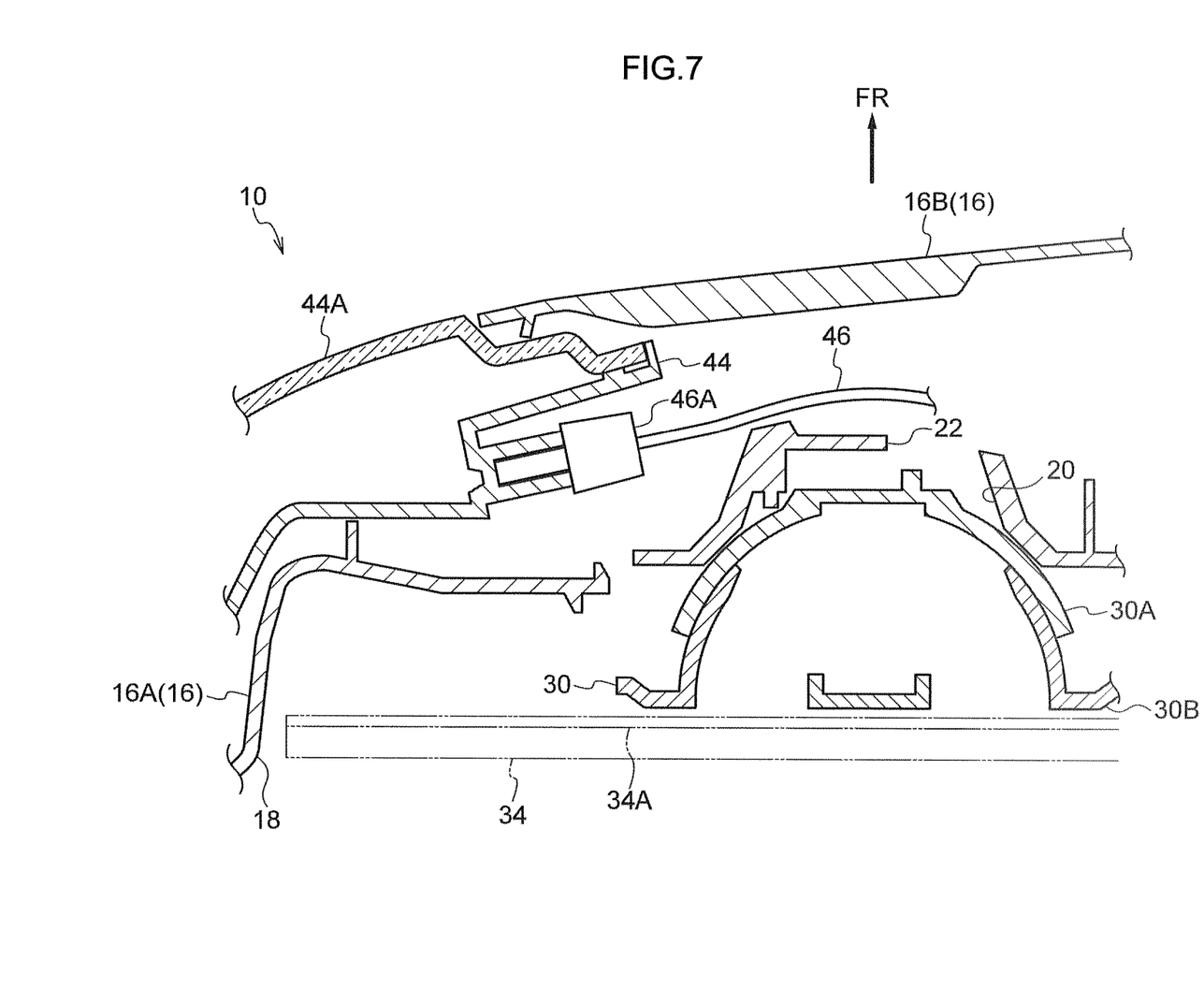
FIG. 7 is a cross-section (a cross-section along line 7-7 in FIG. 1), illustrating a vehicle door mirror device according to an exemplary embodiment of the present invention, as viewed from the lower side.

The first cord 36 is inserted inside the first hook portion 40 and the second hook portion 42 by resiliently deforming, the first hook portion 40 and the second hook portion 42 toward the vehicle front side (see FIG. 6). The first cord 36 is hooked onto the first hook portion 40 and the second hook portion 42, and the first cord 36 is restricted from unhooking (releasing hooking) from the first hook portion 40 and the second hook portion 42 by the projections.

A turn signal lamp 44 (lamp), serving as a addition mechanism, is assembled to a vehicle width direction outside portion of the visor body 16A from the vehicle front side. The turn signal lamp 44 is provided with a lamp portion 44A. The lamp portion 44A is exposed to the outside of the lower visor cover 16B and the upper visor cover, and the lamp portion 44A lights up on actuation of the turn signal lamp 44.

A second cord 46 (harness) is electrically connected to the turn signal lamp 44. Routing (arrangement) of the second cord 46 is explained as follows. The second cord 46 is arranged (laid out) to the turn signal lamp 44 at the vehicle front side of the visor body 16A. A leading end of the second cord 46 is provided with a second connector 46A (see FIG. 7), and the second connector 46A is electrically connected to the turn signal lamp 44 so as to electrically connect the second cord 46 to the turn signal lamp 44. The second cord 46 is arranged (laid out) penetrating (passing) through the storing mechanism 14 (the stand 14A and the rotating body 14B) in the up-down direction, and is arranged (laid out) penetrating through the stay 12. The turn signal lamp 44 is electrically connected to the vehicle body side, namely, the vehicle controller by the second cord 46.

The second cord 46 is inserted inside the hook 24 by resiliently deforming the upper side and lower side hook portions 24A of the hook 24 of the visor body 16A toward the upper side and the lower side, respectively. The second cord 46 is hooked onto the hook 24, and the second cord 46 is restricted from unhooking (releasing hooking) from the hook 24 by the leading end side portions of the pair of hook portions 24A (see FIG. 5). The second cord 46 is disposed at the vehicle rear side of the rotating body 14B of the storing mechanism 14, and passes between the rotating body 14B and the visor body 16A (see FIG. 3). The second cord 46 is disposed between the assembly locations of the rotating body 14B to the visor body 16A using the screws 28 (see FIG. 4), thereby restricting the second cord 46 from coming away from the vehicle rear side of the rotating body 14B.

The second cord 46 is inserted inside the first hook portion 40 and the second hook portion 42 of the first connector 36A by resiliently deforming the first hook portion 40 and the second hook portion 42 toward the vehicle front side (see FIG. 6). The second cord 46 is hooked onto the first hook portion 40 and the second hook portion 42, and is restricted from unhooking (releasing hooking) from the first hook portion 40 and the second hook portion 42 by the projections of the first hook portion 40 and the second hook portion 42. The reinforcement 26 is disposed at the vehicle front side of the second hook portion 42, and the reinforcement 26 restricts resilient deformation (movement) of the second hook portion 42 toward the vehicle front side. The second connector 46A is connected to the turn signal lamp 44 at the vehicle width direction outside of the second hook portion 42.

An elongated strap shaped first tape 48, serving as a binding member, is wrapped around the outer periphery of the first cord 36 and the second cord 46 over a range from the portions hooked onto the hook 24 up to portions between the rotating body 14B and the visor body 16A. The first cord 36 and the second cord 46 are bound together by the first tape 48 (see FIG. 3 to FIG. 5). This thereby facilitates hooking of first cord 36 and the second cord 46 onto the hook 24, and effectively restricts unhooking (releasing hooking) from the first hook portion 40 and the second hook portion 42. Moreover, the first cord 36 and the second cord 46 are suppressed from becoming bite between the rotating body 14B and the visor body 16A.

An elongated strap shaped second tape 50, serving as a binding member, is wrapped around the outer periphery of the first cord 36 and the second cord 46 at a portion between the first hook portion 40 and the second hook portion 42. The first cord 36 and the second cord 46 are bound together by the second tape 50 (see FIG. 6). The placement of the first cord 36 and the second cord 46 between the first hook portion 40 and the second hook portion 42 is accordingly defined and prescribed.

Next, explanation follows regarding operation of the present exemplary embodiment.

In the vehicle door mirror device 10 configured as described above, in the storing mechanism 14, the rotating body 14B rotates with respect to the stand 14A such that the visor 16, the mirror 34, etc. rotating integrally with the rotating body 14B. The visor 16, the mirror 34, etc. are thereby stored (housed) (cease (release) to project out with respect to the door) by being rotated toward the vehicle width direction inside. The visor 16, the mirror 34, etc. are stood (deployed or opened out, returned) (project out with respect to the door) by being rotated toward the vehicle width direction outside.

In the mirror face adjustment device 30, at least one of the pair of motors 32 is driven under control of the controller so as to tilt the mirror holder 30B and the mirror 34 in at least one of the up-down direction or the vehicle width direction. The orientation of the mirror 34 (angle of the mirror face 34A) is accordingly adjusted in at least one of the up-down direction and the vehicle width direction.

The turn signal lamp 44 is actuated to light up the lamp portion 44A under control of the controller.

Note that the mirror face adjustment device 30 is assembled to the visor body 16A by inserting the mirror face adjustment device 30 into the accommodating chamber 18 and the assembly chamber 20 of the visor body 16A of the visor 16 from the vehicle rear side (one side), and fixing the case 30A of the mirror face adjustment device 30 inside the assembly chamber 20 of the visor body 16A.

The storing mechanism 14 is disposed on the vehicle front side (another side) of the visor body 16A. The first cord 36 and the second cord 46 are arranged (laid out) passing through the storing mechanism 14 (the stand 14A and the rotating body 14B) in the up-down direction.

The assembly hole 22 is formed penetrating the bottom wall of the assembly chamber 20 of the visor body 16A. The first connector 36A of the first cord 36 is assembled to the vehicle front side wall of the case 30A of the mirror face adjustment device 30 from the vehicle front side of the visor body 16A through the assembly hole 22, and is electrically connected to the pair of motors 32 of the mirror face adjustment device 30.

Moreover, the turn signal lamp 44 is fixed to the vehicle front side of the visor body 16A on the opposite side of the mirror face adjustment device 30 with respect to the storing mechanism 14 (the rotating body 14B), and the second connector 46A of the second cord 46 is electrically connected to the turn signal lamp 44.

Note that the first cord 36 and the second cord 46 are disposed on the vehicle rear side (the mirror 34 side) of the rotating body 14B, and pass between the rotating body 14B and the visor body 16A. The first cord 36 and the second cord 46 can accordingly be made shorter, and the arrangement (layout) route of the first cord 36 and the second cord 46 can be simplified, compared to a case in which the first cord 36 and the second cord 46 are arranged (laid out) at the upper side of the rotating body 14B. Moreover, the first cord 36 and the second cord 46 can be suppressed from coming into contact with the reinforcement 26, unlike in a case in which the first cord 36 and the second cord 46 are disposed at the vehicle front side of the rotating body 14B (on the opposite side to the mirror 34) and pass between the rotating body 14B and the reinforcement 26.

The second cord 46 is arranged (laid out) at the first connector 36A at the vehicle front side of the mirror face adjustment device 30 (on the opposite side to the mirror 34). The second cord 46 can accordingly be made shorter, and the arrangement (layout) route of the second cord 46 can be simplified, compared to a case in which the second cord 46 is arranged (laid out) at the upper side of the mirror face adjustment device 30.

Moreover, not only is the first cord 36 hooked onto the first hook portion 40 and the second hook portion 42 of the first connector 36A, but the second cord 46 is also hooked onto the first hook portion 40 and the second hook portion 42. There is accordingly no need to provide another (separate) hook portions for hooking the second cord 46, enabling a simple configuration.

The reinforcement 26 is assembled to the vehicle front side of the visor body 16A in an assembled state of the first connector 36A to the vehicle front side wall of the case 30A. The reinforcement 26 is disposed at the vehicle front side of the second hook portion 42, so the reinforcement 26 restricts resilient deformation of the second hook portion 42 toward the vehicle front side. The first cord 36 and the second cord 46 can accordingly be effectively restricted from unhooking (releasing hooking) from the second hook portion 42.

When assembling of the first connector 36A to the vehicle front side wall of the case 30A of the mirror face adjustment device 30 through the assembly hole 22 from the vehicle front side of the visor body 16A, the peripheral face on the vehicle width direction inside and lower side of the first connector 36A is disposed substantially along the peripheral edge at the vehicle width direction inside and lower side of the assembly hole 22, and the projecting wall 22A of the visor body 16A fits together with the fitting hole 38 of the first connector 36A. This thereby enables the assembly position and assembly orientation of the first connector 36A with respect to the case 30A to be confirmed, thus enabling easy assembly of the first connector 36A to the mirror face adjustment device 30.

When assembling of the first connector 36A to the vehicle front side wall of the case 30A of the mirror face adjustment device 30 through the assembly hole 22 from the vehicle front side of the visor body 16A, the vehicle front side face of the first connector 36A is in the same plane as (flush with) the vehicle front side face of the bottom wall of the assembly chamber 20 of the visor body 16A. This thereby enables confirmation that the terminal of the first connector 36A has been sufficiently inserted into the case 30A so as to be suitably connected to the pair of motors 32, and enables assembly of the first connector 36A to the mirror face adjustment device 30 to be made even simpler.

In the present exemplary embodiment, it is applied to the vehicle door mirror device 10. However, it may be applied to other mirror devices at the interior or exterior of a vehicle.

In the present exemplary embodiment, the visual recognition section is configured by the mirror 34. However, the visual recognition section may be configured by a camera that assists vision of an occupant using captured images.

What is claimed is:

1. A vehicle visual recognition device, comprising:
    a storing mechanism that is supported at a vehicle body side;
    a visual recognition section that is supported at the storing mechanism, that assists visual recognition of a vehicle occupant, and that is stored or deployed by being rotated by the storing mechanism;
    an addition mechanism that is supported at the storing mechanism, and that adds a function; and
    a cord that is arranged in the storing mechanism, that is arranged on a visual recognition section side of the storing mechanism such that a part of the cord, which is from the storing mechanism to a connection portion connected to the addition mechanism, is arranged between the storing mechanism and the visual recognition section, and that is electrically connected to the addition mechanism.

2. The vehicle visual recognition device of claim 1, wherein:
    the storing mechanism includes a rotating body that rotates with respect to the vehicle body;
    the addition mechanism is an adjustment mechanism that is supported at the storing mechanism and that adjusts orientation of the visual recognition section; and
    the cord is arranged on a visual recognition section side of the rotating body.

3. The vehicle visual recognition device of claim 2, further comprising:
    a hooking portion that is disposed at the adjustment mechanism, and onto which the cord is hooked; and
    a restriction member that is disposed on the opposite side of the hooking portion from the cord, and that restricts movement of the hooking portion.

4. The vehicle visual recognition device of claim 1, wherein:
    the storing mechanism includes a rotating body that rotates with respect to the vehicle body;
    the addition mechanism includes: an adjustment mechanism that is supported at the storing mechanism and that adjusts orientation of the visual recognition section, and an addition section that is supported at the storing mechanism, and that is disposed on the opposite side of the adjustment mechanism from the rotating body;
    the cord includes a first cord that electrically connects the vehicle body side with the adjustment mechanism, and a second cord that electrically connects the vehicle body side with the addition section; and the first cord and the second cord are arranged on a visual recognition section side of the rotating body.

5. The vehicle visual recognition device of claim 4, wherein the second cord is arranged on the opposite side of the adjustment mechanism from the visual recognition section.

6. The vehicle visual recognition device of claim 5, further comprising:
    a hooking portion that is disposed at the adjustment mechanism, and onto which the first cord and the second cord are hooked; and
    a restriction member that is disposed on the opposite side of the hooking portion from the first cord and the second cord, and that restricts movement of the hooking portion.

7. The vehicle visual recognition device of claim 6, wherein the addition section is a lamp.

8. The vehicle visual recognition device of claim 1, wherein:
- the addition mechanism and the storing mechanism are disposed at the same side with respect to the visual recognition section, and
- the storing mechanism is disposed between a portion of the cord arranged at the storing mechanism and a connected portion of the cord connected to the addition mechanism.

9. A vehicle visual recognition device, comprising:
- a storing mechanism that is supported at a vehicle body side;
- an adjustment mechanism that is supported at the storing mechanism;
- a visual recognition section that is supported at the adjustment mechanism, that assists visual recognition of a vehicle occupant, that is tilted and adjusted in orientation by the adjustment mechanism, and that is stored or deployed by being rotated by the storing mechanism;
- an addition mechanism that is supported at the storing mechanism, that is disposed on the opposite side of the adjustment mechanism from the storing mechanism, and that adds a function; and
- a cord that is arranged in the storing mechanism, that is arranged on the opposite side of the adjustment mechanism from the visual recognition section, and that is electrically connected to the addition mechanism.

10. The vehicle visual recognition device of claim 9, further comprising:
- a hooking portion that is disposed at the adjustment mechanism, and onto which the cord is hooked; and
- a restriction member that is disposed on the opposite side of the hooking portion from the cord, and that restricts movement of the hooking portion.

* * * * *